July 14, 1942.                R. M. GARDNER                2,289,354
        APPARATUS FOR BAKING FLUORESCENT LAMP TUBING AND THE LIKE
                    Filed July 20, 1940           2 Sheets-Sheet 1

ROLAND M. GARDNER
           INVENTOR.

BY Laurence Burns,
                ATTORNEY

July 14, 1942.   R. M. GARDNER   2,289,354
APPARATUS FOR BAKING FLUORESCENT LAMP TUBING AND THE LIKE
Filed July 20, 1940   2 Sheets-Sheet 2

ROLAND M. GARDNER
INVENTOR.
BY Lawrence Burns,
ATTORNEY.

Patented July 14, 1942

2,289,354

UNITED STATES PATENT OFFICE 2,289,354

APPARATUS FOR BAKING FLUORESCENT LAMP TUBING AND THE LIKE

Roland M. Gardner, Swampscott, Mass., assignor to Hygrade Sylvania Corporation, Salem, Mass., a corporation of Massachusetts Application July 20, 1940, Serial No. 346,617

1 Claim. (Cl. 263—6)

This invention refers to a machine for baking coated tubing and more particularly to a machine for baking tubing with a coating of luminescent material therein.

An object of the invention is to provide a machine to bake out the binder used to hold the luminescent powders in suspension.

Another object of this invention is to provide a machine for baking luminescent coated tubing in such a manner that a uniform, smoothly coated tubing will result.

Other objects and features of the invention will be apparent from the following description taken in conjunction with the accompanying drawings in which.

Similar reference characters refer to similar parts in the several views of the drawings and in the specifications which follow.

Luminescent-coated tubing is usually prepared by applying to the interior of the tube of glass, a suspension of luminescent material in a vehicle containing one viscous substance such as nitrocellulose, baking the tubing until the binder decomposes to a dark residue of carbon or the like, and continuing the baking in the presence of air to remove the residue, leaving a coating of luminescent material.

Figure 1:
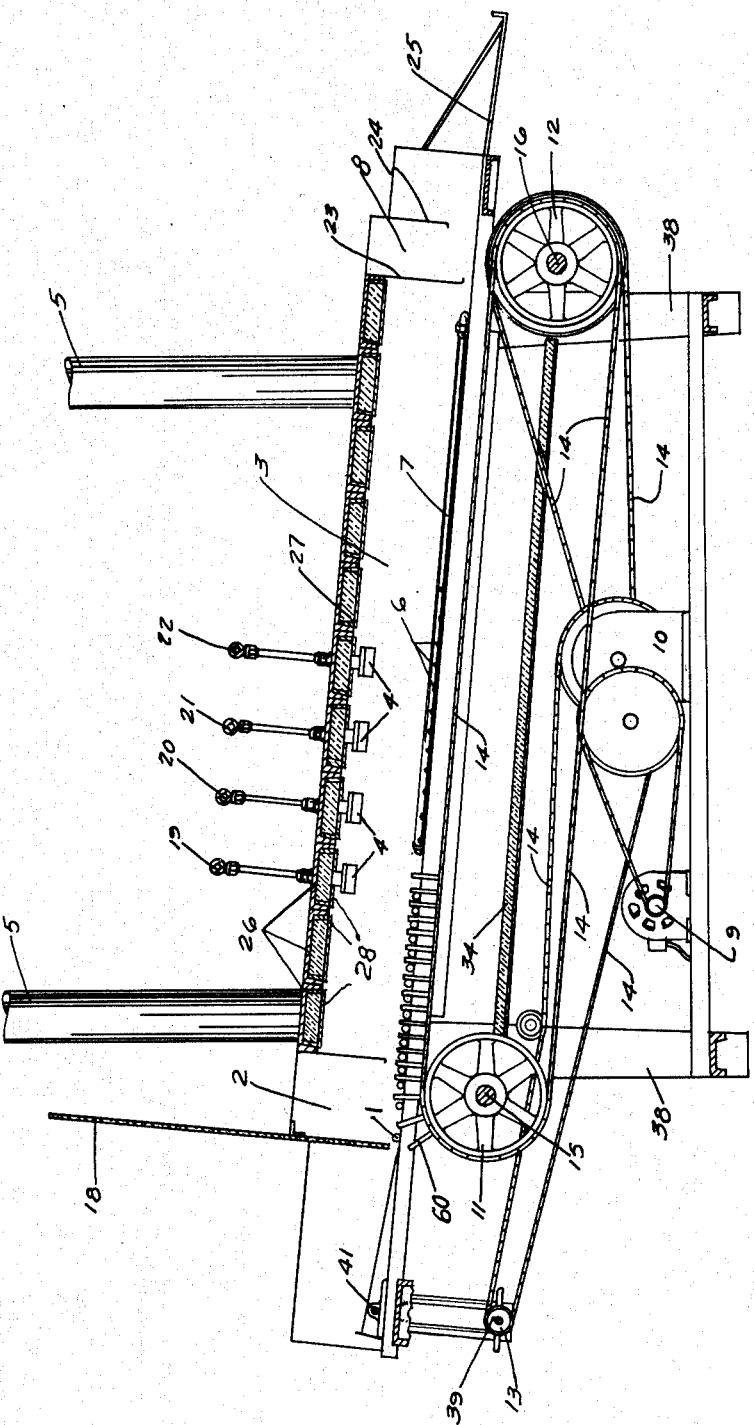
Figure 1 is a side elevational view in section of the baking oven.

In Figure 1, the tubing 1 to be baked is rolled down into the preheating chamber 2 where it strikes a set of conveyor pins 60 which control the movement of the tubing through the main heating chamber 3. The oven itself is an inclined plane. Thus the friction of the tubing on the inclined plane results in the tubing rolling down the baking oven floor, its speed controlled by the speed with which the conveyor pins move. As the tubing passes through the main heating chamber 3, it is heated by the down-draft burners 4. This heating results in the decomposition of the binder which is driven off through the exhaust stacks, 5, by the air through the vents 6 of the manifold 7. The rearward section of the main heating chamber 3, acts as an annealing chamber and finally the tubing passes into the cooling chamber 8. This chamber is merely shielded off from the main heating chamber. There are no burners therein, thus the temperature is much lower in this chamber than in the main heating chamber 3. The tubing finally passes out of the cooling chamber 8 coated with a smooth uniform coating of fluorescent material.

Figure 2:
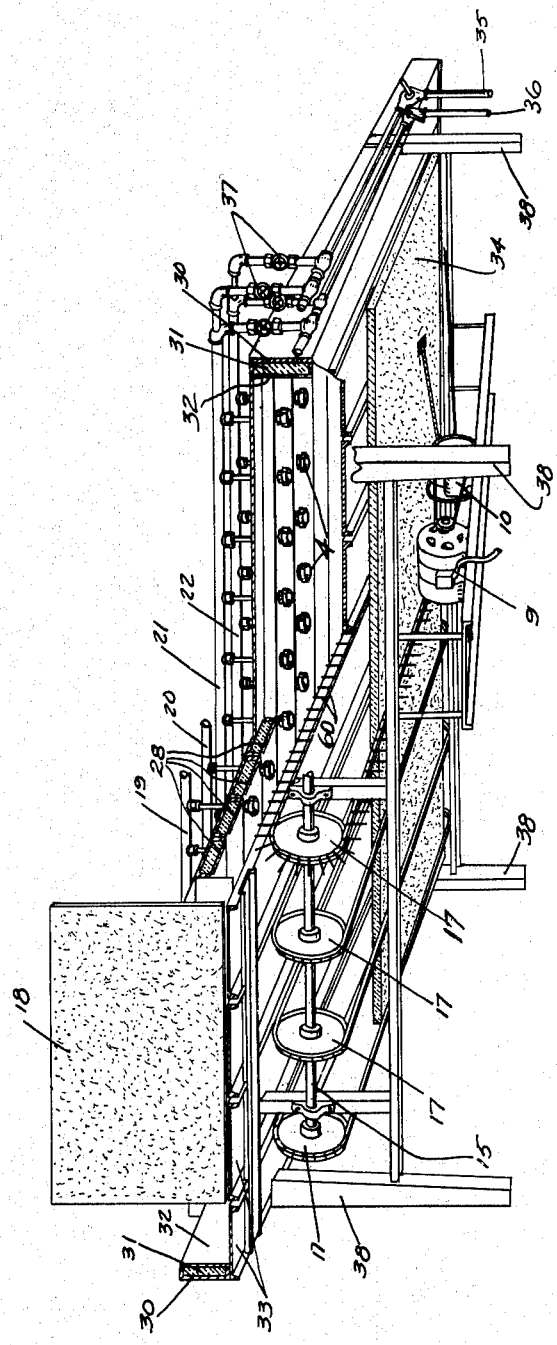
Figure 2 is a front perspective view of the baking oven from below and shown partly in section.

In Figure 1, the motor 9 drives the gear reduction mechanism 10 which activates the wheels 11, 12 and 13 through the chain drives 14. The wheels 11 and 12 rotate about the shafts 15 and 16. The wheels 17 in Figure 2 are keyed to the shaft 15. About each of these wheels 17 rotates an endless chain with the conveyor pins 60 attached thereto. Similarly the wheel 12 rotating on the shaft 16 provides the active force to turn the wheels similar to 17 located on shaft 16. The gear reduction ratio is governed by the speed at which it is desired to have the tubing pass through the oven. This will of course be governed in turn by the temperature of the oven and the amount of heat necessary to properly bake the tubing.

The asbestos shield 18 across the front of the mouth of the oven helps to prevent drafts from entering the oven as well as to keep heat in the preheating chamber 2. When the tubing rolls into this chamber, it strikes the pins 60 which stop it from rolling down the floor of the baking oven any faster than it takes for the pins with which it is in contact to move through the oven. Thus these pins insure a steady, uniform rolling of the tubing along the floor of the oven.

When the tubing enters the main heating chamber, 3, it is heated by the down-draft burners 4 attached to the burner headers 19, 20, 21 and 22. The heat from these burners decomposes the binder in the luminescent coating in the tubing and the coating turns to a dark brown color. This brown carbon residue is then driven off in a gaseous state through the exhaust stacks 5 when the tubing passes the vents 6 of the air manifold 7.

Since the burners are up at the forward end of the main heating chamber 3, the temperature of the oven towards the rear of this chamber tends to drop. This drop in temperature at the rearward end of the chamber 3 helps to anneal the tubing that has just been baked. The metal baffle plates 23 and 24 at the rearward extremity of the main heating chamber 3 help to break and prevent any drafts from entering the oven from this end of the machine. These plates 23 and 24 also form a separate cooling chamber 8. The temperature in this chamber is much less than it is in the rearward end of the main heating chamber, yet it is appreciably higher than the room temperature. After the tubing passes out of this chamber 8 it rolls down the incline 25, a finished product.

The burners 4 projecting through the roof of the oven from the burner headers 19, 20, 21 and 22 are mounted in the channel iron units 26. The roof of the oven consists of a series of channel iron beams 26. Magnesia heat-insulating blocks 27 are inserted in the channels of the channel iron beams 26 and are held therein by the stainless steel sheets 28. Thus it is apparent that with this type of roof construction, one or more rows of burners may readily be removed for cleaning or replacement service.

In Figure 2, the construction of the sides and the floor of the oven is shown. The side walls of the oven consist of two long channel iron units 30 with magnesia heat-insulating blocks 31 held therein by the stainless steel sheets 32. Stainless steel sheets are used as an interior covering on the walls and the roof of the oven because they act as reflector to keep the heat in the oven.

The floor of the oven consists of a series of channel iron sections 33 so spaced as to provide for the movement of the conveyor pins therebetween. Beneath this oven floor is the asbestos shield 34 which helps insulate the motor and gear reduction drive from the heat radiated by the oven floor.

In Figure 2, the burners 4, which are ceramic cups, are shown in their extension through the roof of the oven from the burner headers 19, 20, 21 and 22. These headers are supplied by the gas and air lines 35 and 36, respectively. The flow through these lines may be controlled by the needle valves 37.

The machine as a whole is supported on the legs 38 in such a manner that the floor of the oven will be an inclined plane sufficient to cause the tubing to roll due to the friction of the tubing on the oven floor.

The oven temperature will vary with the sizes of tubing and types of glass used. It is desirable to keep the oven temperature as high as possible and at the same time at a point safely below the temperature at which the tubing would start to bend or melt.

It must be understood that the conveyor pins 60 attached to the endless chains on wheels 17 extend completely around the circuit of the chains.

What I claim is:

An oven for baking internally coated tubing for electric discharge lamps, said oven comprising: a refractory floor; means for moving said tubing along said floor; refractory side-walls; a refractory heat-reflecting roof; downwardly-directed burners projecting into the interior of the oven from said roof, said burners being spaced from the ends of the oven; an air manifold running along the floor of the oven from one end of said oven and having vents near the middle of the oven; and exhaust stacks at the ends of the oven.

ROLAND M. GARDNER.